United States Patent [19]

Kawazoe et al.

[11] Patent Number: 4,826,520
[45] Date of Patent: May 2, 1989

[54] BURNER FOR PRODUCING GLASS FINE PARTICLES AND METHOD OF MAKING GLASS

[75] Inventors: Hideyo Kawazoe; Makoto Koguchi, both of Ichihara; Katsumi Orimo, Chiba, all of Japan

[73] Assignee: The Furukawa Electric Co., Ltd., Tokyo, Japan

[21] Appl. No.: 186,658

[22] Filed: Apr. 20, 1988

Related U.S. Application Data

[63] Continuation of Ser. No. 866,289, May 23, 1986, abandoned.

[30] Foreign Application Priority Data

May 27, 1985 [JP] Japan ................. 60-113583

[51] Int. Cl.$^4$ ........................... C03B 37/018
[52] U.S. Cl. ..................... 65/3.12; 65/18.2; 65/21.1; 65/144; 239/85; 239/416
[58] Field of Search ............ 65/18.2, 21.1, 144, 65/3.12; 239/85, 416

[56] References Cited

U.S. PATENT DOCUMENTS 4,474,593 10/1984 Andrejco et al. ............... 65/3.12
4,618,354 10/1986 Suda et al. ..................... 65/3.12

OTHER PUBLICATIONS

H. Suda et al., "High-Rate Synthesizing Technique ... by Vad Method", Nat'l Conf. of Semiconductor Material, Report No. 367.
H. Suda et al., "High-Rate Deposition Vad Method", Nat'l Conf. of Semiconductor Material, Report No. 1138.

Primary Examiner—Arthur Kellogg
Attorney, Agent, or Firm—Foley & Lardner, Schwartz, Jeffery, Schwaab, Mack, Blumenthal & Evans

[57] ABSTRACT

A burner for producing glass fine particles provided with an intermediate passage between a central passage and an outer passage for surrounding the periphery of the central passage characterized by that the end of the intermediate passage is disposed inner side from the end of the outer passage and the end of the central passage is disposed between the end of the intermediate passage and the end of the outer passage. Thus, the burner can stably fabricate porous glass base material having GI type or triangular refractive index distribution and yet can suppress the production of bubbles.

6 Claims, 2 Drawing Sheets

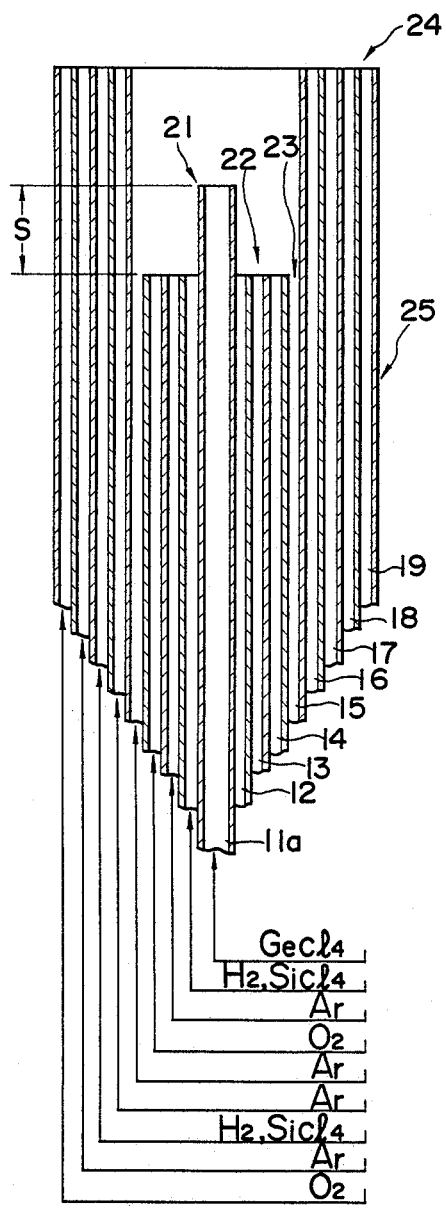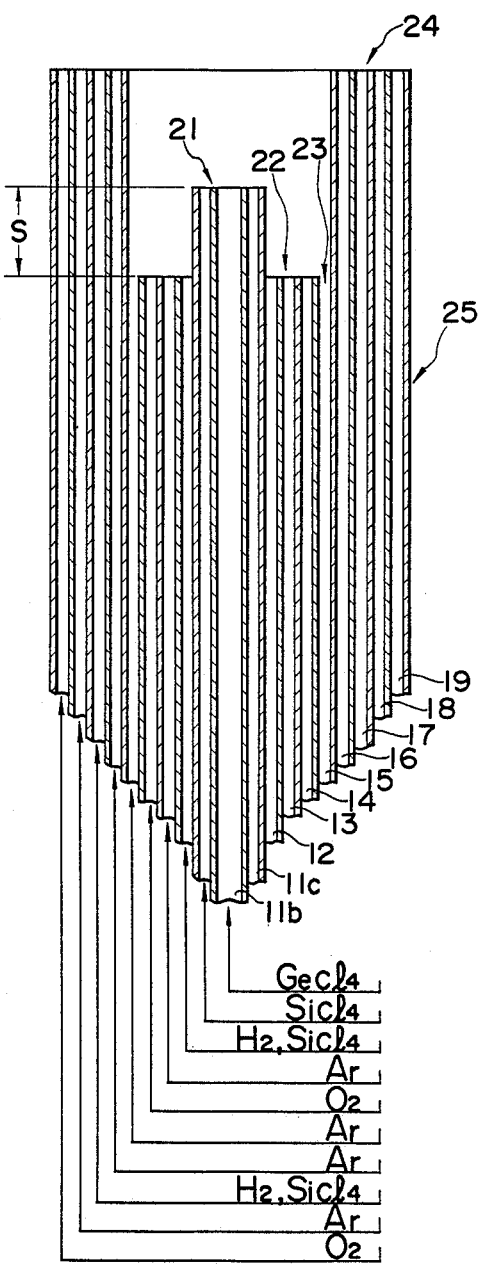

FIG. 3
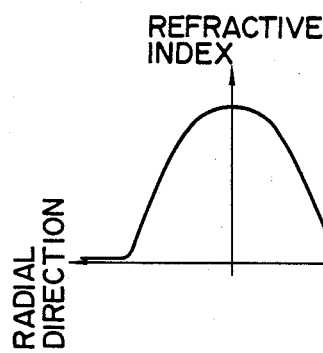
FIG. 4
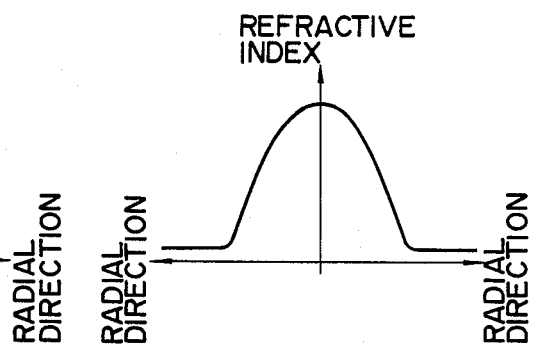
FIG. 5
FIG. 7
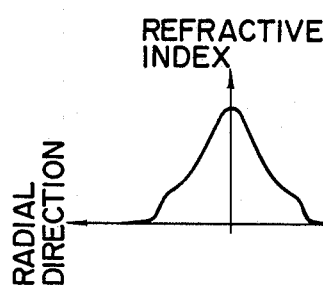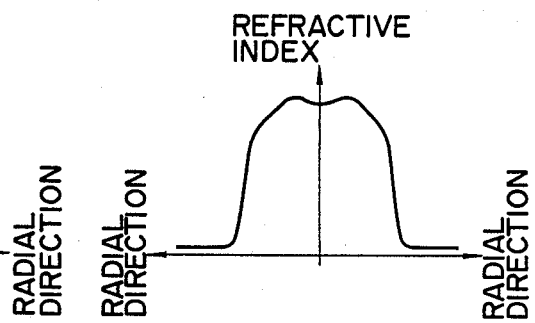
FIG. 6
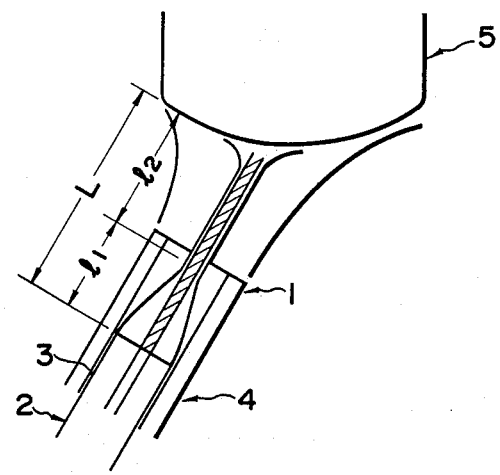

BURNER FOR PRODUCING GLASS FINE PARTICLES AND METHOD OF MAKING GLASS

This application is a continuation of application Ser. No. 866,289, filed May 23, 1986, now abandoned.

BACKGROUND OF THE INVENTION

This invention relates to a burner for producing glass fine particles used in fabricating a porous glass base material for a communication or an optical system.

Optical fibers, light guides, image fibers or rod lenses used in the fields of communication and optical systems are fabricated by producing a predetermined base material by means such as MCVD method, VAD method of OVD method, spinning the optical fiber base material thus obtained, and reducing in diameter a rod lens base material.

A conventional method of synthesizing a porous glass base material at high speed for an optical fiber by a VAD method of the abovementioned methods is alredy disclosed as a double flame burner system (Report No. 367 of National Conference of Semiconductor Material Section in the Association of the Japanese Electric Communication Society in 1983, and Report No. 1138 of National Conference of the Association of the Japanese Electric Communication Society in 1984).

The outline of this double flame burner system is as shown in FIG. 6, and will be briefly described.

In FIG. 6, a burner 1 made of a multiwall tube structure has an inner flame generator 2, and an outer flame generator 4 provided on the outer periphery of the generator 2 through a sealing gas passage 3 in a relative relationship that the end of the generator 2 is disposed inside the inner end of the generator 4.

The generator 2 of the both generators is formed of four-wall passage, and the generator 4 is formed of five-wall passage in such a manner that the passages are concentrically disposed.

1.54 liter/min. of $SiCl_4$, 0.41 liter/min. of $GeCl_4$, 10.5 liter/min. of $H_2$, 5 liters/min. of Ar and 15 liters/min. of $O_2$ are supplied to the generator 2 by the burner 1 as an example of the VAD method, 5 liters/min. of Ar is supplied to the sealing gas passage 3, 5 liters/min. of Ar, 0.41 liter/min. of $SiCl_4$, 24 liters/min. of $H_2$, 5 liters/min. of Ar and 25 liters/min. of $O_2$ are supplied to the generator 4, the flame hydrolytic reaction products of the respective gases, i.e., soot-state glass fine particles are accumulated through the burner 1 in a desired shape to form a porous glass base material 5.

When the base material 5 is thus formed, an inner flame having a length $l_1$ is generated from the end of the generator 2 as shown in FIG. 6, an outer flame having a length $l_2$ is generated from the end of the generator 4, and, since the flames continue in the longitudinal direction, the total flame length L of the burner 1 becomes $L = l_1 + l_2$.

The total flame is considerably longer than the single flame, and a gas stream of the raw material system shown by hatched lines in FIG. 6 stays long in the flame.

As a result, the growth of glass fine particles in the flame is accelerated, the particle diameter increases, and the accumulating efficiency is enhanced by the inertial effect to synthesize the porous glass base material 5 at a high speed.

In the case of the abovementioned double flame burner system, it is adapted for high speed synthesis of the porous glass base material 5, but when doping raw material for forming a refractive index distribution is supplied to the generator 2 to react with the flame, the dopant is diffused more than required in the flame due to the long staying time in the flame, and the density distribution is broadened (flattened).

Thus, the refractive index of the porous glass base material 5 is formed in an (step index) shape as shown in FIG. 7, and the porous glass base material for the optical fiber having GI type refractive index distribution and triangular refractive index distribution cannot be obtained.

In addition, when the doped raw material such as $GeCl_4$ stays in the flame for long time, crystalline $GeO_2$ is generated in the flame, bonded to the base base material 5, and bubbles are formed in the base material at transparent vitrifying time.

SUMMARY OF THE INVENTION

Accordingly, an object of this invention is to provide a burner for producing glass fine particles which can eliminate the drawbacks and disadvantages, can stably fabricate porous glass base material having GI type or triangular refractive index distribution while subpressing the production of bubbles.

According to this invention, there is provided a burner for producing glass fine particles provided with an intermediate passage between a central passage and an outer passage for surrounding the periphery of the central passage characterized in that the end of the intermediate passage is disposed inward from the end of the outer passage and the end of the central passage is disposed between the end of the intermediate passage and the end of the outer passage.

In the burner of this invention, the central passage is, for example, formed of a single-wall passage, the intermediate passage is formed of a triple passage, and the outer passage is formed of a quadruple passage, and when a sealing gas passage is interposed between the intermediate passage and the outer passage, $GeCl_4$ is supplied to the central passage, $H_2$, $SiCl_4$, Ar and $O_2$ are applied to the intermediate passage, Ar, $SiCl_4$, $H_2$, and $O_2$ are supplied to the outer passage, and Ar is supplied to the sealing gas passage. The burner is held in a burning state so the gases react to produce the glass fine particles.

When the glass fine particles are thus produced, the flame injected from the end of the intermediate passage and the flame injected from the end of the outer passage continue in the longitudinal direction.

Therefore, the total flame length of the burner is increased, the growth of the glass fine particles is accelerated by the long flame and the accumulating speed of the particles is enhanced to accelerate the synthesizing speed of the porous glass base material.

On the other hand, in case of the central passage for blowing doped raw material such as $GeCl_4$, since the end of the central passage is interposed between the end of the intermediate passage and the end of the outer passage, the doped raw material is not blown by the longitudinal intermediate of the total flame so that the doped raw material is not exposed over the entire length of the total flame.

Therefore, the staying time of the doped raw material is not lengthened in the flame, and excessive diffusion of the dopant is suppressed in the flame. Thus, when the glass fine particles produced in this state are accumulated, the dopant density of the central portion is high, and the dopant density decreases toward the outer periphery in the refractive index distribution, i.e., GI type refractive index distribution can be obtained in the porous glass base material.

In the burner of this invention, when the central passage is formed, for example, of a double-wall passage, the intermediate passage is formed of three-wall passage, and the outer passage is formed of four-wall passage, and a sealing gas passage is interposed between the intermediate passage and the outer passage, $GeCl_4$ and $SiCl_4$ are supplied to the central passage, $H_2$, $SiCl_4$, Ar and $O_2$ are supplied to the intermediate passage, Ar is supplied to the sealing gas passage, and Ar, $SiCl_4$, $H_2$, Ar, $O_2$ are supplied to the outer passage, the burner is held in a burning state so the gases react to produce the glass fine particles.

In this case, the porous glass base material having the GI type refractive index distribution or triangular refractive index distribution can be obtained by the same reasons as described above.

Since in any state, the staying time of the doped raw material in the flame is not lengthened, crystalline dopant for causing bubbles is not produced, and the base material having preferable characteristics can be obtained.

The above and other related objects and features of the invention will be apparent from a reading of the following description of the disclosure found in the accompanying drawings and the novelty thereof pointed out in the appended claims.

BRIEF DESCRIPTION OF THE DRAWINGS

FIGS. 1 and 2 are sectional views of embodiments of a burner for producing glass fine particles according to the present invention;

FIGS. 3 to 5 are graphs illustrating the refractive index distributions of porous glass base material produced through the burner of this invention;

FIG. 6 is a schematic explanatory view of the conventional burner; and

FIG. 7 is a graph illustrating the refractive index distribution of the porous glass base material produced by the conventional burner.

DESCRIPTION OF THE PREFERRED EMBODIMENTS

Embodiments of a burner for producing glass fine particles according to the present invention will be described in detail with reference to the accompanying drawings.

In FIG. 1, showing an embodiment of the present invention, a burner 25 of a multiwall tube (nine-wall tube) structure has a central passage 21, an intermediate package 22, a sealing gas passage 23 and an outer passage 24.

The central passage 21 is constructed of a tube 11a, the intermediate passage 22 is constructed of passage units 12 to 14, the sealing gas passage 23 is constructed of a passage unit 15, and the outer passage 24 is constructed of passage units 16 to 19.

In the abovementioned burner 25, the end of the passage 22 is disposed axially inwardly from the end of the outer passage 24, and the end of the central passage 21 is interposed between the end of the intermediate passage 22 and the end of the outer passage 24.

In FIG. 2, showing another embodiment of the present invention, the central passage 21 of the burner 25 is constructed of double-wall passage units 11b and 11i c, and the other configuration is the same as the embodiment in FIG. 1.

The passage units 11b, 11c in FIG. 2 coincide at the ends.

When a VAD method is performed by the burner 25 constructed as described above, the gases described above are supplied to the burner 25 to produce flame hydrolytic reaction to continuously inject the glass fine particles thus produced toward a rotating target to accumulate to grow, thereby producing a porous glass base material.

The embodiment of this case will be further described with reference to following Table.

In the example using the burner in FIG. 1, the inner passage unit 11a having 5 mm in inner diameter was provided in the passage 12 having 12 mm in inner diameter, and the projecting length (S in FIG. 1) of the passage unit 11a for the passage 12 was 20 mm.

On the other hand, in the example using the burner in FIG. 2, the inner diameter of the passage unit 11b was 5 mm, the inner diameter of the passage unit 11c was 12 mm, and the projecting length (S in FIG. 2) of the both passage units 11b, 11c for the passage 12 was 20 mm.

TABLE

| Gas | Passage | Example 1 Flow rate liter/min. | Example 2 Flow rate liter/min. | Example 3 Flow rate liter/min. |
|---|---|---|---|---|
| $GeCl_4$ | 11a | 0.41 | — | — |
| $GeCl_4$ | 11b | — | 0.41 | 0.41 |
| $SiCl_4$ | 11c | — | 0.73 | 1.40 |
| $H_2$ | 12 | 10.50 | 10.50 | 10.50 |
| $SiCl_4$ | 12 | 1.54 | 0.81 | 0.14 |
| Ar | 13 | 5.00 | 5.00 | 5.00 |
| $O_2$ | 14 | 15.00 | 15.00 | 15.00 |
| Ar | 15 | 5.00 | 5.00 | 5.00 |
| Ar | 16 | 5.00 | 5.00 | 5.00 |
| $H_2$ | 17 | 24.00 | 24.00 | 24.00 |
| $SiCl_4$ | 17 | 0.41 | 0.41 | 0.41 |
| Ar | 18 | 5.00 | 5.00 | 5.00 |
| $O_2$ | 19 | 25.00 | 25.00 | 25.00 |

The base material having the refractive index distribution (GI type) as shown in FIG. 3 was obtained by the example 1 in Table, the base material having the refractive index distribution (GI type) as shown in FIG. 4 was obtained by the example 2, and the base material having the refractive index distribution (triangular) in FIG. 5 was obtained by the example 3.

When the triangular refractive index distribution of FIG. 5 is formed, it is preferable to accelerate the flowing velocity of the $SiCl_4$ injected from the passage unit 11c as compared with that of the $GeCl_4$ injected from the passage unit 11b and to enclose the Ge flow by the Si flow.

In other words, the Ge density in the center of the flame is preferably increased as compared with that at the GI refractive index distribution forming time.

In the embodiments described above, the double-wall flame burner system has been essentially described. However, the invention is not limited to the particular embodiment. For example, multiwall flame burner system having three-walls or more may be executed by increasing the number of passage units.

Even in the double-wall flame burner as shown, the number of passage units may be increased unless any defect occurs.

Further, the effect of altering the position of the end of the central passage may be provided in response to the desired refractive index distribution. In this case, the passage unit 11a in FIG. 1 or the passage units 11b, 11c in FIG. 2 may be formed slidably with respect to the passage.

According to this invention as described above, the burner of the invention has the end of the central passage disposed between the end of the intermediate passage and the end of the outer passage. Therefore, porous glass base material of high quality which has GI or triangular refractive index distribution and having almost no bubbles can be stably produced with good reproducibility.

What is claimed is:

1. A multiple flame burner for producing glass fine particles comprising:
   means for producing a first flame including means defining an outer passage for supplying gases through an open end to produce said first flame;
   means for producing a second flame including means defining an intermediate passage for supplying gases through an open end to produce said second flame, said intermediate passage being disposed radially inwardly from said outer passage and said first and second flames uniting to form an increased length flame; and
   means defining a central passage having an open end for supplying dopants, said central passage disposed radially inwardly from said intermediate passage and having an open end being axially disposed between said outer passage open end and said intermediate passage open end, whereby excessive diffusion of said dopants in said increased length flame is prevented.

2. The burner according to claim 1, wherein said means defining central passage is formed of a single passage unit.

3. The burner according to claim 1, wherein said means defining central passage is formed of a double-wall passage unit.

4. A process for producing porous glass material having a GI or triangle refractive index distribution comprising the steps of:
   providing a multiple flame burner comprising a means for producing a first flame including means defining an outer passage having an open end, a means for producing a second flame including means defining an intermediate passage disposed radially inwardly from said outer passage and having an open end and a means defining a central passage disposed radially inwardly from said intermediate passage and having an open end axially disposed between said outer passage open end and said intermediate passage open end;
   supplying gases through said outer and intermediate passages to produce said first and second flames;
   supplying dopants through said central passage during said supplying gases step; and
   accumulating hydrolytic reaction products of said gases to form a glass porous material having a GI or triangle refractive index distribution.

5. A process as claimed in claim 4, wherein said central passage comprises an inner central passage and an outer central passage, said dopants being supplied through said inner central passage during said supplying gases step, and $SiCl_4$ being supplied through said outer central passage.

6. A process as claimed in claim 5, wherein the flowing velocity of $SiCl_4$ is accelerated as compared with that of said dopants to obtain a triangular refractive index distribution.

* * * * *